(12) United States Patent
Zhang

(10) Patent No.: US 7,031,281 B1
(45) Date of Patent: Apr. 18, 2006

(54) METHOD FOR REDUCING OVERHEAD IN FORWARD LINK TRAFFIC MULTIPLEXING

(75) Inventor: Hang Zhang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1037 days.

(21) Appl. No.: 09/721,700

(22) Filed: Nov. 27, 2000

(51) Int. Cl.
*H04B 7/216* (2006.01)

(52) U.S. Cl. .................... 370/335; 370/441

(58) Field of Classification Search ........... 370/335, 370/441, 449, 465, 498; 340/825.52
See application file for complete search history.

(56) References Cited

U.S. PATENT DOCUMENTS

| | | | | |
|---|---|---|---|---|
| 4,858,232 A * | 8/1989 | Diaz et al. | | 370/465 |
| 5,973,609 A * | 10/1999 | Schoch | | 370/449 |
| 6,389,066 B1 * | 5/2002 | Ejzak | | 370/252 |
| 6,393,008 B1 * | 5/2002 | Cheng et al. | | 370/338 |
| 6,850,508 B1 * | 2/2005 | Chang et al. | | 370/335 |
| 6,879,561 B1 * | 4/2005 | Zhang et al. | | 370/235 |
| 6,895,010 B1 * | 5/2005 | Chang et al. | | 370/335 |
| 2004/0098657 A1 * | 5/2004 | Jalali et al. | | 714/758 |
| 2004/0120348 A1 * | 6/2004 | Chang et al. | | 370/474 |

* cited by examiner

*Primary Examiner*—Duc Ho
*Assistant Examiner*—Phuongchau Ba Nguyen
(74) *Attorney, Agent, or Firm*—Anne Kinsman; Borden Ladner Gervais LLP

(57) ABSTRACT

A method and frame structure for assembling a forward link traffic multiplexing frame for transmission of packets over a radio link. The method consists of splitting a conventional user ID to provide a group ID and a sub-user ID for each packet or RLP frame. The packets belonging to each group are then assembled together in a forward link traffic multiplexing frame in which each group is identified by its group ID or a group identification field, and the packets in the group are identified according to the terminal or user to which they are destined. This splitting of the user ID results in reduced layer 2 overhead, thereby increasing system capacity for the transmission of user traffic.

30 Claims, 5 Drawing Sheets

METHOD FOR REDUCING OVERHEAD IN FORWARD LINK TRAFFIC MULTIPLEXING

FIELD OF THE INVENTION

The present invention relates generally to wireless communications. More particularly, the present invention relates to a method for reducing overhead in forward link traffic multiplexing, and frame structure for achieving such reduction.

BACKGROUND OF THE INVENTION

The design of current third generation (3G), and enhanced 3G, wireless access networks is driven by the need for high speed internet access. Increasingly, consumers are moving to wireless communications for the delivery of services and applications using conventional TCP/IP (Transmission Control Protocol/Internet Protocol), or other packet-based protocols. This trend is growing with the increase in internet-enabled wireless devices available to users, including cellular telephones, Personal Digital Assistants (PDAs), and other devices. The applications that are now available, or contemplated, for wireless devices include access to services such as the World Wide Web, video telephony, voice over IP and e-mail, etc.

Current wireless access networks, both second generation (2G) and 3G systems, are connection-oriented designs. In 2G systems, a physical connection, or radio link, is set up between a wireless terminal, mobile or fixed, and the network by a simple call setup procedure. Such a call setup procedure includes information exchange, or authentication, and resource allocation, or channel assignment, for both the forward link and the reverse link. After this call setup procedure, the resources allocated are dedicated to the user until the call is released. Any traffic received by the terminal on the dedicated forward link channel belongs to this terminal. Any traffic received by the network on the dedicated reverse link is from the terminal. Such connection-oriented design is suitable to stream type of applications, such as voice, video and audio. However, for internet packet applications, significant resources are wasted due to the characteristically high burstyness of packet applications.

In order to increase the efficiency of resource utilization, current 3G systems, such as those developed under the cdma2000 1xRTT standard and the Universal Mobile Telecommunications System (UMTS), can provide resource sharing on forward link supplemental channels. A single supplemental channel can be shared among multiple terminals on a Time Division Multiple Access (TDMA) basis. The supplemental channel is allocated to a terminal for a certain period of time, generally in the range of a few tens of milliseconds, by a procedure called burst transmission.

The above-described resource allocation mechanisms, whether dedicated channels or dedicated time slices, are both essentially connection-oriented. Once a resource is allocated to a terminal, whether there is traffic to the terminal or not, the resource is always occupied by this terminal. While this makes user traffic identification simple, these designs are not optimal for internet packet applications.

High speed wireless internet access, through packet-based wireless access networks, is currently being developed. In a packet-based wireless access network, radio resources are dynamically allocated to users on packet-by-packet basis for increased system capacity. Such dynamic resource sharing on the forward link requires users to efficiently identify traffic directed to them. Typically, a user ID is used for this purpose. Each user packet is encapsulated in a radio link protocol (RLP) frame for the purpose of retransmission over a radio link. An appropriate user ID precedes each packet in the RLP frame, and is used by the terminals to identify their traffic.

One example of such a forward link traffic multiplexing format is shown in FIG. 1. User packets are encapsulated in RLP frames 50. The RLP frames 50 are then assembled into a forward link traffic multiplexing frame 52 with an appropriate user identification (ID) 54 preceding each RLP frame 50. The user IDs 54 are generally N-bit binary strings.

The forward link traffic multiplexing frame 52 is a layer 2 (L2) frame. The functions of L2 in a wireless access network are mainly resource management, traffic multiplexing and radio link quality improvement. As will be understood by those of skill in the art, some overhead including the user IDs 54 is introduced by L2, and this overhead occupies certain system resources. Clearly, more user traffic, as opposed to overhead, can be transmitted in each forward link traffic multiplexing frame if this overhead can be reduced.

This problem becomes especially acute as wireless internet access increases, and more services are provided by internet, such as stock information, weather forecasts, mobile location notices, etc. Such applications share common characteristics, such as very short packet sizes in the range of a few bytes, very bursty transmission, and delay insensitivity as compared to stream type applications. L2 control packets are also typically very short and quite bursty. For both these types of packets sent on a forward multiplexing channel, the user ID can account for significant percentage of the L2 frame.

It is, therefore, desirable to provide a method and frame structure that minimizes L2 overhead, such that more user traffic can be supported, thereby increasing system capacity and throughput.

SUMMARY OF THE INVENTION

It is an object of the present invention to obviate or mitigate at least one disadvantage of previous methods for reducing overhead in wireless communications. In particular, it is an object of the present invention to present an improved method and frame structure for forward link traffic multiplexing.

In a first aspect, the present invention provides a method for assembling a forward link traffic multiplexing frame for transmission of a plurality of packets over a radio link. The method consist of determining which of a plurality of packets is associated to a group. The packets belonging to the group are then assembled in a forward link traffic multiplexing frame in which the group is identified, by a group identifier or a group identification field, and the packets in the group are identified according to the terminal or user to which they are destined. Such packet identification is typically achieved by providing a sub-user identifier for each packet. In a presently preferred embodiment of this method of the present invention, the number or length of the packets in the group is provided, as is the number or length of groups within the multiplexing frame.

According to a second aspect of the present invention, there is provided a forward link traffic multiplexing frame structure for transmission of a plurality of packets over a radio link. The frame structure includes a plurality of packets that are associated to a group, a group identification, such as a group identifier or a group identification field, and a sub-user identification for each packet, such as a sub-user identifier. The group identification can also include the length or number of packets in the group. Typically, a plurality of groups are included in the frame, and a multiplex header is provided that includes the number of groups in the frame.

In a further aspect, the present invention provides a method for detecting a packet, in a forward link traffic multiplexing frame, that is destined to a terminal. The method begins with receiving the forward link traffic multiplexing frame at the terminal. The frame is then examined to determine if a group associated to the terminal is included in the frame. A group identifier or group identification field can be used to make this determination. The group is then examined, such as by examining sub-user identifiers associated with each packet in the group, to determine if packet (s) destined to the terminal is contained within the group. Such packet(s) are then retrieved.

A further aspect of the present invention provides a wireless access network for transmitting a plurality of packets over a radio link. The wireless access network includes a scheduler for scheduling a plurality of packets for transmission over a radio link. The scheduler passes the scheduled packets to a multiplexer that assembles them into a forward link traffic multiplexing frame. The multiplexer determines which packets are associated to a group, and assembles the group of packets into the forward link traffic multiplexing frame while providing an identification of the group an identification of a destined terminal for each of the packets in the group.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
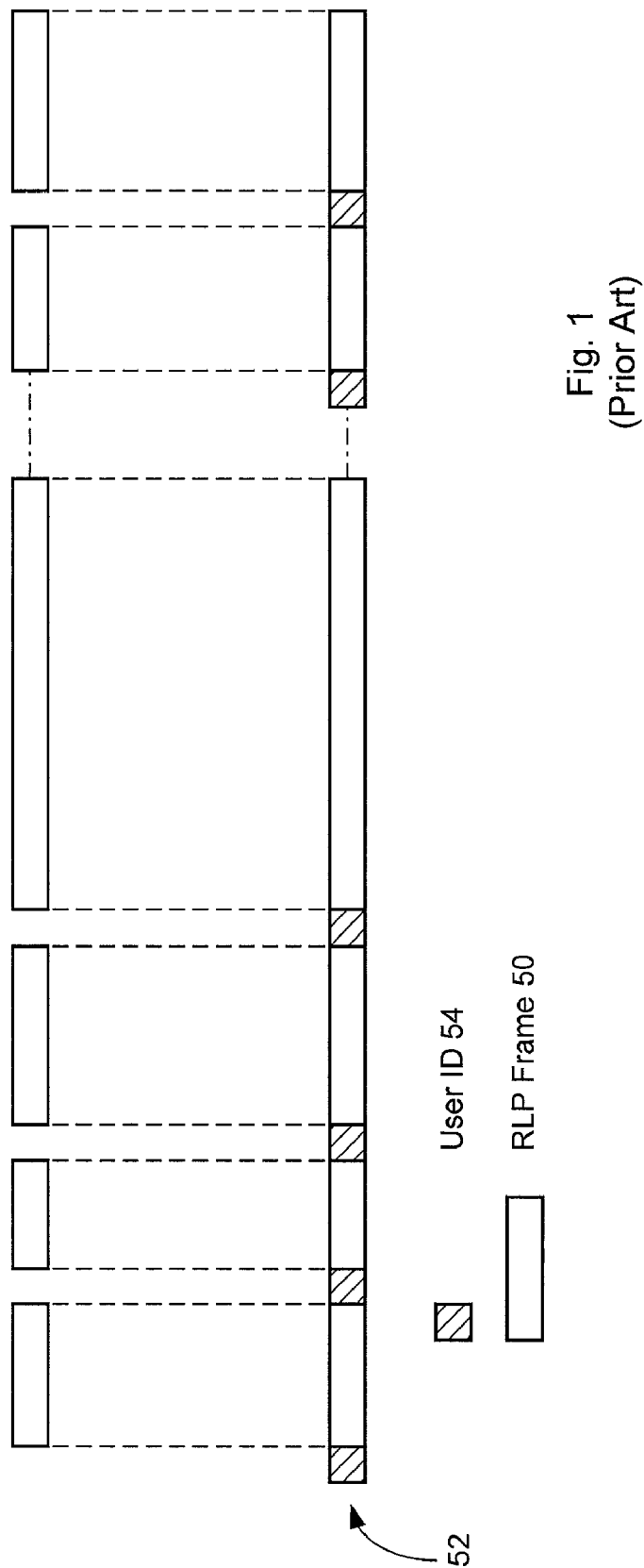
FIG. 1 is a diagram showing the assembly of a forward link multiplexing frame according to the prior art.

In current dynamic forward link multiplexing systems, a user accesses a wireless network 100 and is assigned a user identifier (ID) for the purposes of traffic identification. The user ID consists of N bits of information that uniquely identifies the user. As used herein, a user is a wireless terminal 102, whether mobile or fixed. Generally, the present invention provides a method and L2 frame structure for reducing overhead in forward link traffic multiplexing by determining a group identification and a user identification for each packet by splitting the N-bit user ID into a group ID $N_1$ and a sub-user ID $N_2$, where $N=N_1+N_2$. Packets are then associated to their respective group, based on their group ID.

The group is then assembled in a forward link traffic multiplexing frame, and the packets in the group are identified according to the terminal, or user, to which they are destined, as determined by their sub-user ID.

In forward link multiplexing, a scheduler 104 schedules packets, received from servers 108 or from other terminals 102, to multiple users based on certain criteria, such as the packets' quality of service (QoS) criteria. Once the scheduler 104 makes its decision concerning which packets are to be sent in a current frame, a multiplexer 106 assembles the packets into the current frame and appends appropriate header and packet identification information, such that the receiving terminals 102 can identify their respective packets. Typically, prior to assembly by the multiplexer 106, the packets are encapsulated as RLP frames that include information relative to such functions as retransmission. In order to simplify the description of the present invention, it is assumed that each RLP frame includes one packet, and the terms "packet" and "RLP frame" are used interchangeably. However, as will be apparent to those of skill in the art, an RLP frame can encapsulate multiple packets destined to a single user, or can encapsulate a fragment of an RLP frame, and the present invention is intended to encompass both single packet RLP frames, RLP frame fragments, and multiple packet RLP frames. Once encapsulated, the RLP frames are transmitted, according to appropriate layer 1 protocols, over a radio link 110.

Figure 2:
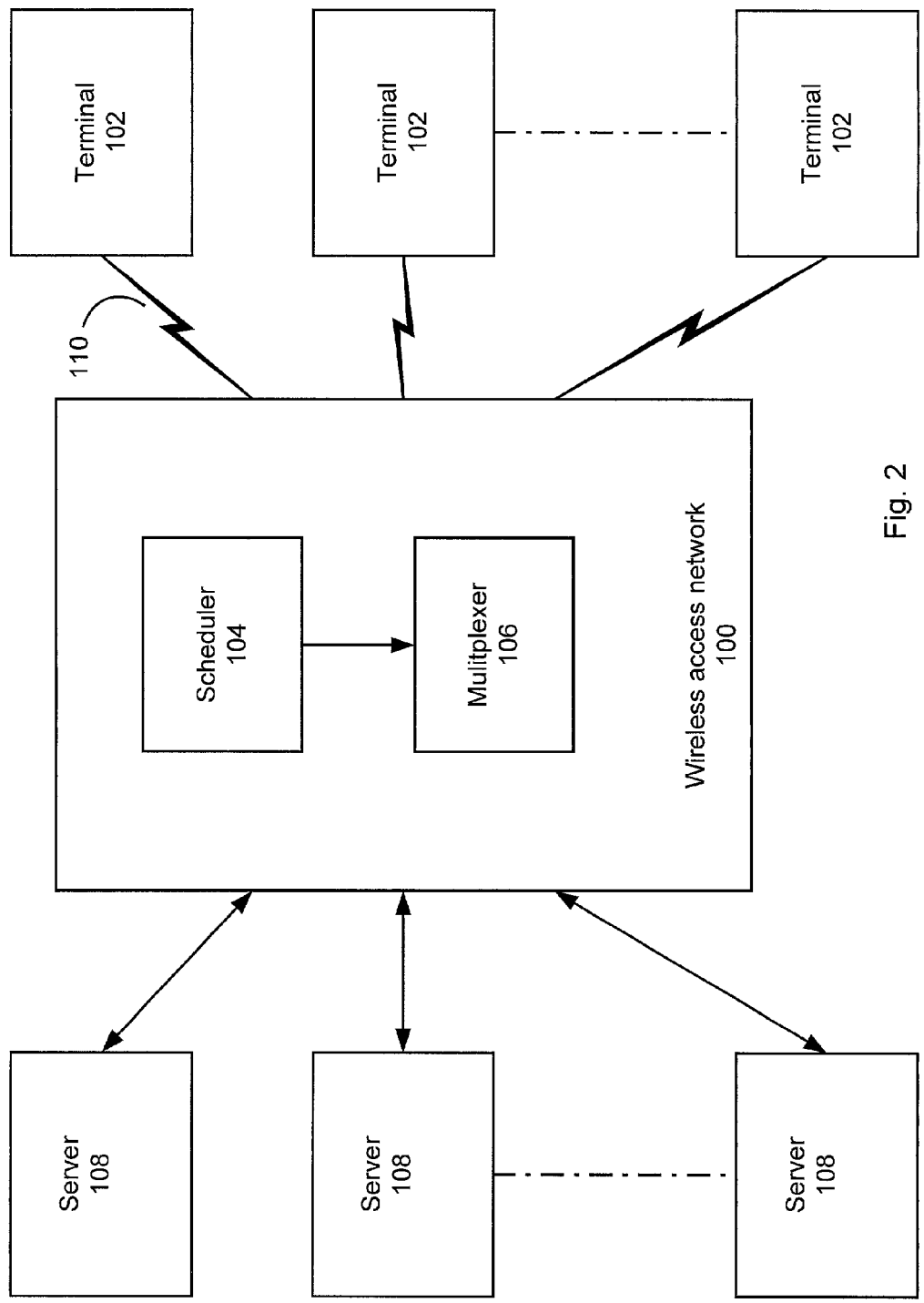
FIG. 2 is a block diagram of a wireless communication system according to the present invention.
Figure 3:
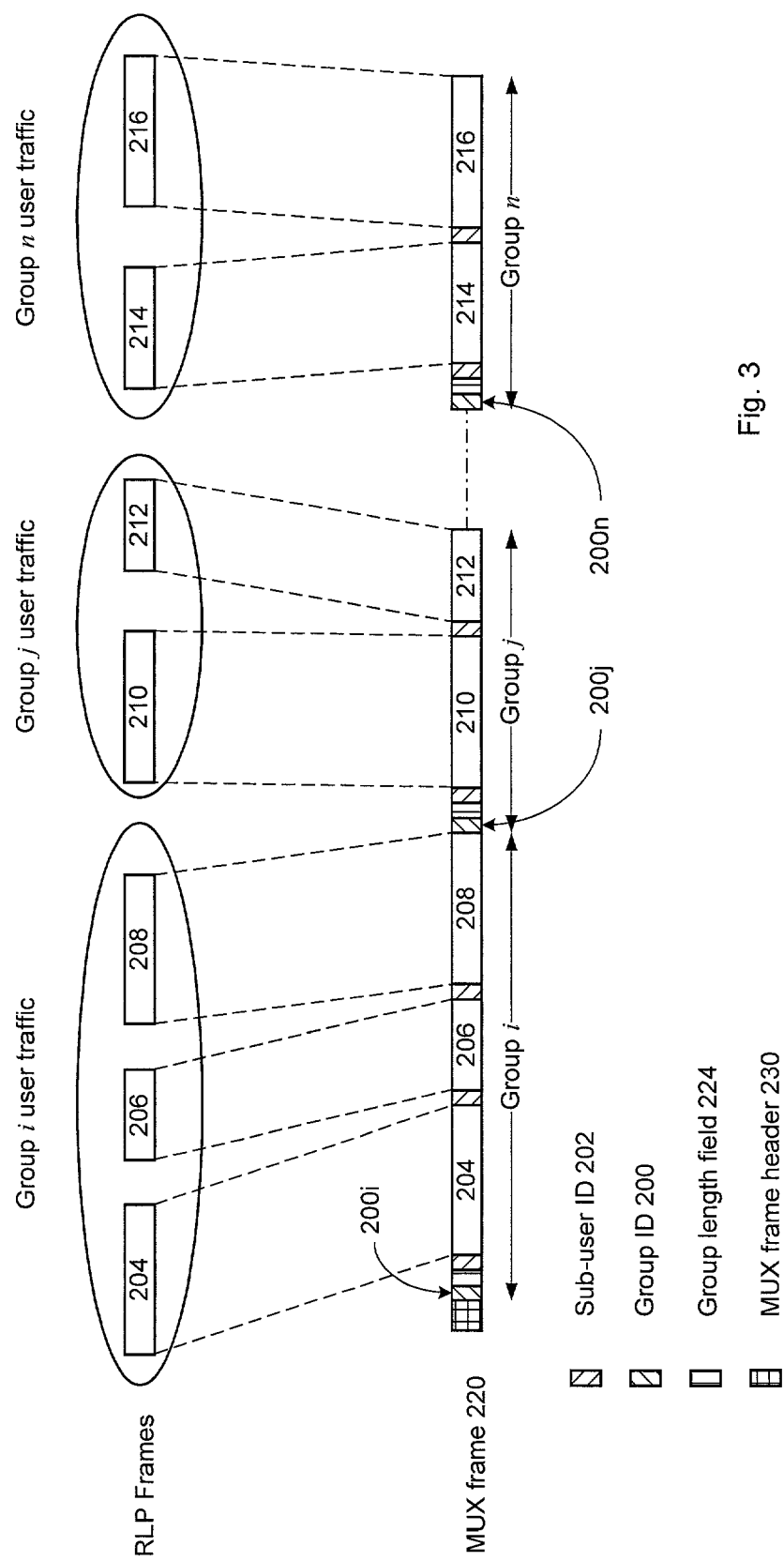
FIG. 3 is a diagram showing the assembly of a forward link multiplexing frame according to a first embodiment of the present invention.

Referring to FIG. 2 and FIG. 3, a first embodiment of the present invention is presented. The N-bit user ID, referred to above, is split into two parts, $N_1$ and $N_2$, where $N_1$ is a group ID 200, $N_2$ is a sub-user ID 202, and $N=N_1+N_2$. All the users with the same group ID 200 are associated to the same group, while each user in a particular group is identified by its sub-user ID 202. As illustrated in FIG. 2, a number of RLP frames 204–216 are scheduled for transmission in a current frame. The user IDs of RLP frames 204–216 have been split, and grouped according to their respective group IDs 200$i$, 200$j$, and 200$n$. RLP frames 204, 206, and 208 are destined to users of a Group i, RLP frames 210 and 212 are destined to users of a Group j, and RLP frames 214 and 216 are destined to users of a Group n.

At the network side, the multiplexer 106 assembles a forward link multiplexing (MUX) frame 220. The multiplexer 106 groups together RLP frames from the same group. For example, as shown, the RLP frames 204–208, destined to users of Group i, are first assembled into the MUX frame 220. Preceding Group i, the group ID 200$i$ is added to identify Group i. A group length field 224 follows the group ID 200$i$. The group length field 224 indicates the octet length of the group. Alternatively, particularly for fixed length RLP frames, a group number field can be used to indicate the number of RLP frames in the group (i.e. for Group i, the number field would indicate that three RLP frames are included in the group). Together, the group ID 200 and group length field 224 provide the group identification. Within Group i, the RLP frames 204–208 are each preceded by their respective sub-user IDs 202 to provide appropriate user identification. The user traffic for the remaining groups Group j to Group n is encapsulated in the MUX frame 220 in a similar fashion. Each group is preceded by its respective group ID 200$j$–200$n$, and group length field 224, and each RLP frame is preceded by its respective sub-user ID 202. A MUX frame header 230 is appended to the beginning of MUX frame 220. The MUX frame header 230 can include, for example, a frame-type field to indicate that the frame includes traffic from multiple users, and a number field to indicate the number of groups in MUX frame 220.

As will be understood by those of skill in the art, while the illustrated embodiment shows a group length, or number, field 224, length or number fields can also be provided to identify the length or size of the MUX frame 220, and the length of the RLP frames. Fields identifying the length of RLP frames can follow the group ID, or can follow the sub-user ID, as appropriate. Generally, number fields are more appropriate for systems transmitting fixed length RLP frames, whereas length fields are more appropriate for systems relaying variable length RLP frames. Ultimately, the choice of which of the MUX, group and/or RLP frames are provided with length and/or number fields is dependent on system design and optimization criteria.

At the receiving end, once the MUX frame 220 is transmitted over the forward link multiplexing channel 110, terminals 102 having access to the channel receive the MUX frame 220 and must determine whether the frame includes user traffic that is destined to them. Each terminal first examines the group IDs 200 to determine if the MUX frame 220 includes a group associated with the terminal. If a group associated with the terminal is contained within MUX frame 220, the terminal examines the sub-user IDs 202 within the group to determine if the group contains a packet destined to the terminal. If such packet(s) exist, they are retrieved by the terminal and appropriate acknowledgments are sent, as determined by the particular protocols implemented by the wireless access network.

Figure 4:
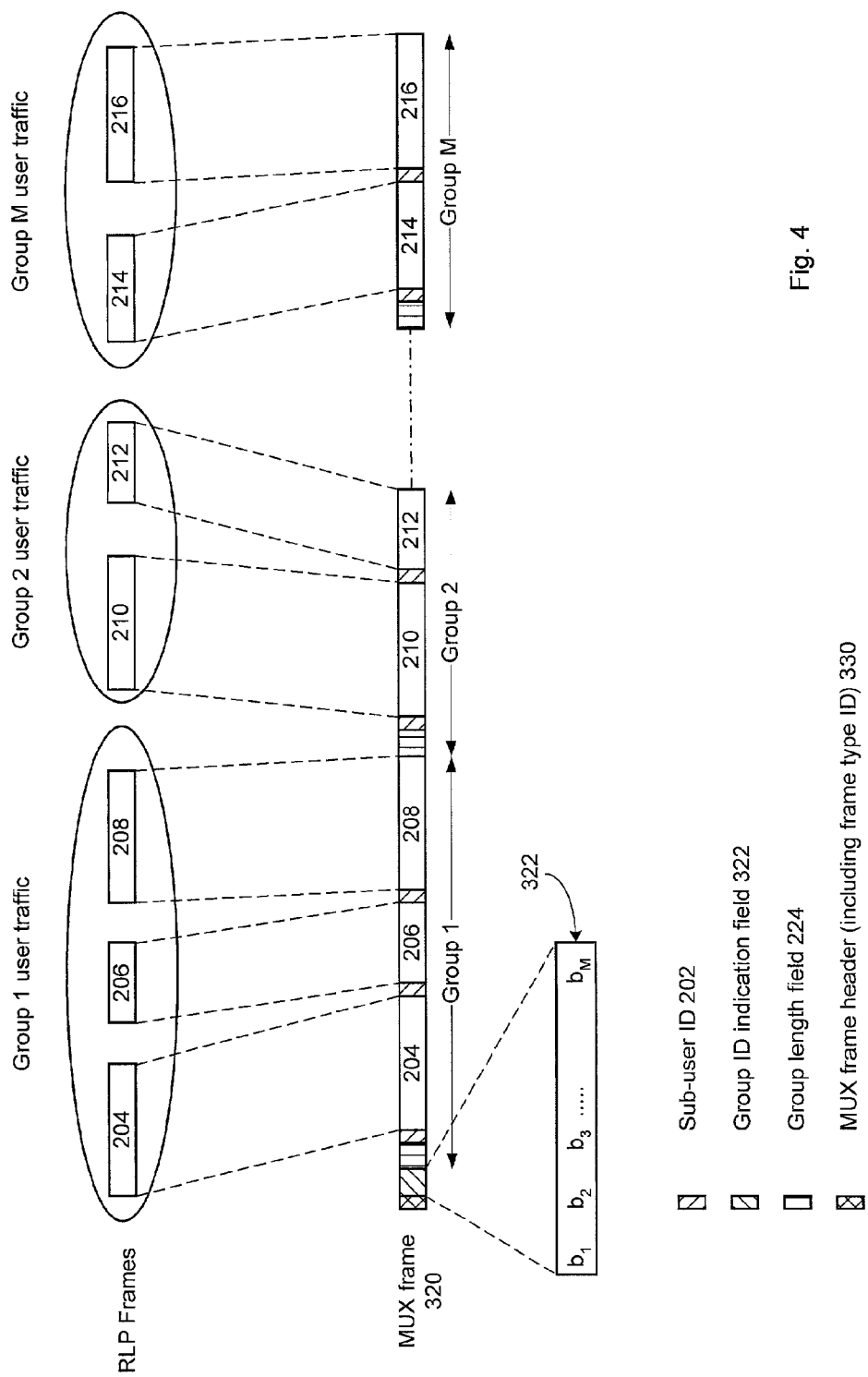
FIG. 4 is a diagram showing the assembly of a forward link multiplexing frame according to a second embodiment of the present invention.

A second embodiment of the present invention is shown in FIG. 4. User traffic, consisting of RLP frames 204–216, grouped in Groups i–n as in the previous example, are scheduled to be assembled into a MUX frame 320. As opposed to providing a group ID at the beginning of each group, a group ID identification field 322 is inserted after a MUX header 330, that includes a frame type identification (i.e. multiple user frame). The group identification field 322 which includes $2^{N1}$ bits, where each bit corresponds to one group. For example, the first bit is for Group 1, the $M^{th}$ bit is for Group M. If a group's bit is set to "1", it means that there is traffic directed to the corresponding group. Conversely, if a group's bit is set to "0", there is no traffic to the corresponding group. An RLP frame's group ID is used to determine to which group the frame belongs, as in the first embodiment. For each group, there can again be a group length or number field 224 indicating the number of users who's traffic is included in the group in this frame. Within each group, user identification is still provided by sub-user IDs 202 preceding each user's RLP frames. A similar sub-user identification field can be implemented in lieu of the sub-user identifiers.

Once transmited over a forward link multiplexing channel, MUX frame 320 is received by users having access to the channel. The user examines the group identification field 322 to determine if the MUX frame 220 includes a group associated with the user. If a group associated with the user is contained within MUX frame 220, the user examines the sub-user IDs 202 within the group, and continues as described above.

Figure 5:
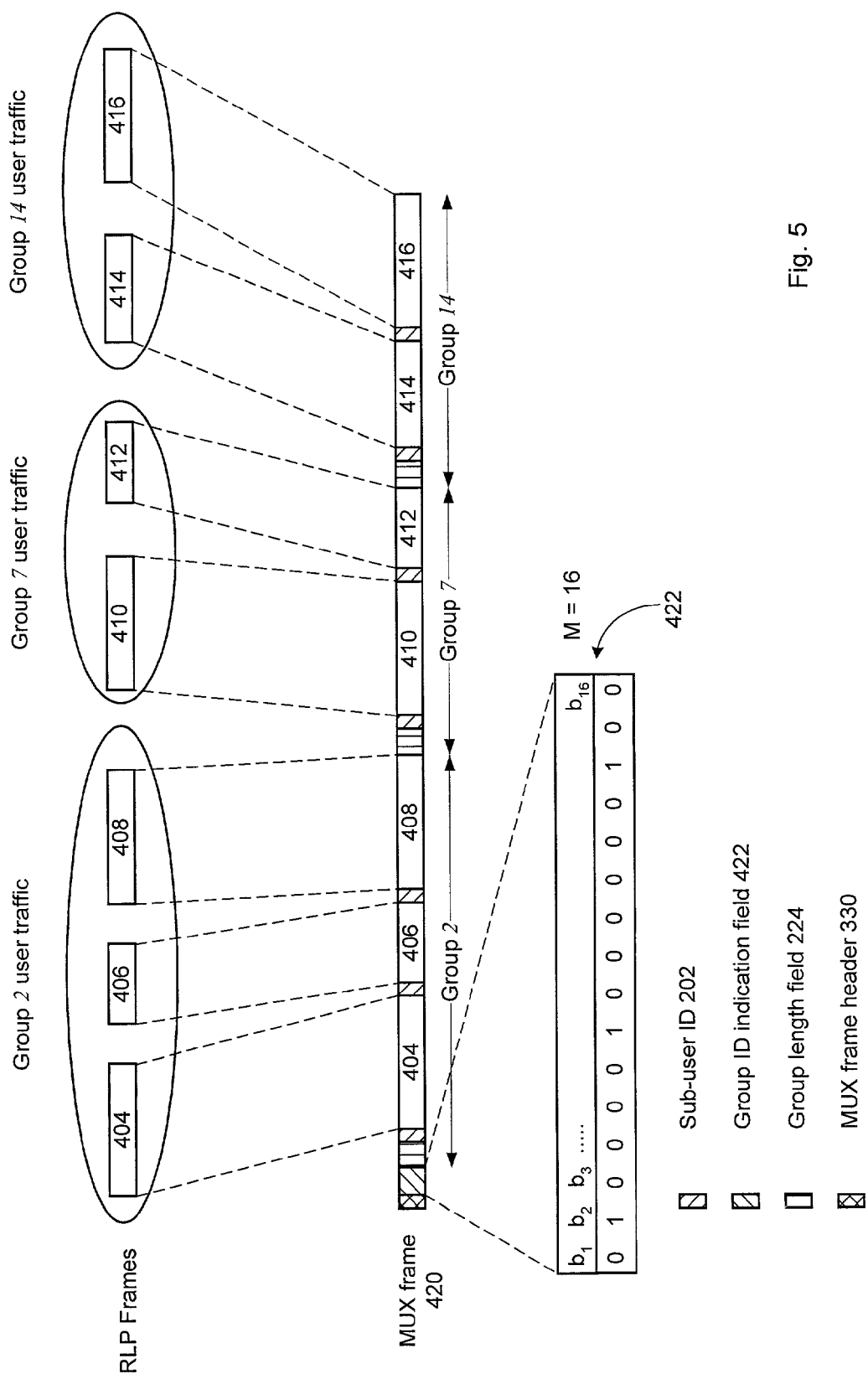
FIG. 5 is a diagram showing an example of the second embodiment of FIG. 3.

FIG. 5 provides an example of the second embodiment of the present invention. The forward link multiplexing channel includes sixteen groups, having four bit binary group IDs from "0000" to "1111", respectively. Packets, encapsulated as RLP frames 404–416, from Group 2, Group 7 and Group 14 are scheduled for transmission in the current MUX frame 420. Packets from Group 2 are identified by a binary group ID of "0001", packets from Group 7 are identified by a binary group ID "1000", and packets from Group 14 are identified by a binary group ID "1101". To indicated that packets from each of these groups are included in the MUX frame 420, the $2^{nd}$, $7^{th}$ and $14^{th}$ bits of the group identification field 422 are set to "1", as shown. The groups are assembled in MUX frame 420 in ascending order: i.e. Group 2, followed by Group 7, and then Group 14. A group length field 224 precedes each group to indicate the number of packets from that group are being transmitted in the MUX frame 420. Within each group, the user's traffic is identified by its respective sub-user ID 202.

As will be understood by those of skill in the art, the present invention can provide significant reductions in overhead, especially when a large number of short packets are being sent to multiple users. Many short packets from multiple users can be collected and grouped, and all packets from a single group can share a single group ID, with short sub-user IDs providing packet identification within each group. Thus, instead of providing, for example, an 8-bit user ID for each of ten packets, thereby requiring eighty bits of overhead, the user IDs are split to provide a 4-bit group ID and a 4-bit sub-user ID for each packet. All packets having the same group ID are grouped together and the group is identified by one 4-bit group ID, with respective sub-user IDs preceding each packet to identify its user within its group. Assuming that two groups are represented, the overhead is thus reduced by 40% to forty-eight bits. By reducing the L2 overhead in this way, a larger amount of user traffic can be encapsulated in each frame, thereby increasing overall system capacity.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for assembling a forward link traffic multiplexing frame for transmission of a plurality of packets over a radio link, comprising:
   (i) determining a plurality of packets associated to a group;
   ii) assembling the group of determined packets in a forward link traffic multiplexing frame;
   (iii) providing an identification of the group in the forward link traffic multiplexing frame; and
   (iv) providing an identification of a destined terminal for each of the determined packets in the group.

2. The method according to claim 1, wherein providing the identification of the group includes providing a group identifier.

3. The method according to claim 1, wherein providing the identification of the group includes providing a group identification field.

4. The method according to claim 1, wherein providing the identification of the group includes providing a group length field.

5. The method according to claim 1, wherein providing the identification of the group includes providing a group number field.

6. The method according to claim 1, wherein providing the identification of the destined terminal for each of the determined packets includes providing a sub-user identifier.

7. The method according to claim 1, further including assembling a plurality of groups in the forward link multiplexing frame.

8. The method according to claim 1, further including providing a multiplex header for the forward link traffic multiplexing frame.

9. The method according to claim 8, wherein providing the multiplex header includes a number field indicating a number of groups in the forward link traffic multiplexing frame.

10. A transmitter for transmission of a plurality of packets over a radio link, comprising:
 a scheduler to schedule packets for transmission; and
 a multiplexer to assemble a forward link traffic multiplexing frame having a plurality of packets associated to a group, a group identification, and a sub-user identification for each of the plurality of packets in the group.

11. The transmitter of claim 10, wherein the group identification includes a group identifier.

12. The transmitter of claim 10, wherein the group identification includes a group identification field.

13. The transmitter of claim 10, wherein the group identification includes a group length field.

14. The transmitter of claim 10, wherein the group identification includes a group length field.

15. The transmitter of claim 10, wherein the sub-user identification includes a sub-user identifier.

16. The transmitter of claim 10, further including a plurality of groups.

17. The transmitter of claim 16, further including a number field for indicating the number of groups.

18. The transmitter of claim 17, wherein the number field is included in a multiplex frame header.

19. A method for detecting a packet in a forward link traffic multiplexing frame that is destined to a terminal, comprising:
 (i) receiving a forward link traffic multiplexing frame at a terminal;
 (ii) determining that the forward link traffic multiplexing frame includes a group associated to the terminal by examining group identification information;
 (iii) determining that the group includes a packet destined to the terminal; and
 (iv) retrieving the packet.

20. The method according to claim 19, wherein determining that the forward link traffic multiplexing frame includes a group associated to the terminal includes examining a group identifier.

21. The method according to claim 19, wherein determining that the forward link traffic multiplexing frame includes a group associated to the terminal includes examining a group identification field.

22. The method according to claim 19, wherein determining that the group includes a packet destined to the terminal includes examining a sub-user identifier.

23. The method according to claim 22, wherein retrieving the packet includes retrieving the packet associated to the sub-user identifier.

24. A wireless access network for transmitting a plurality of packets over a radio link, comprising:
 a scheduler for scheduling a plurality of packets for transmission over a radio link; and
 a multiplexer for assembling a forward link traffic multiplexing frame by determining which packets are associated to a group, assembling the group of determined packets in the forward link traffic multiplexing frame, providing an identification of the group in the forward link traffic multiplexing frame, and providing an identification of a destined terminal for each of the determined packets in the group.

25. A terminal for receiving a forward link traffic multiplexing frame, comprising:
 a receiver for receiving the forward link traffic multiplexing frame;
 means to examine a group identification information to determine that the forward link traffic multiplexing frame includes a group associated to the terminal;
 means to determine that the group includes a packet destined to the terminal; and
 means to retrieve the packet.

26. The terminal according to claim 25, wherein the means to examine the group identification information includes means to examine a group identifier.

27. The terminal according to claim 25, wherein the means to examine the group identification information includes means to examine a group identification field.

28. The terminal according to claim 25, wherein the means to examine the group identification information includes means to examine a group length field.

29. The terminal according to claim 25, wherein the means to determine that the group includes the packet destined to the terminal includes means to examine a sub-user identifier.

30. The terminal according to claim 29, wherein the means to retrieve the packet includes means to retrieve the packet associated to the sub-user identifier.

* * * * *